(12) United States Patent
Kuhn

(10) Patent No.: US 12,103,891 B2
(45) Date of Patent: Oct. 1, 2024

(54) NON ABRASIVE, THIN GLASS SHAPING METHODS, SYSTEMS FOR PERFORMING SUCH METHODS, AND THIN GLASS PRODUCED BY SUCH METHODS

(71) Applicant: Jeffrey Richard Kuhn, Kula, HI (US)

(72) Inventor: Jeffrey Richard Kuhn, Kula, HI (US)

(*) Notice: Subject to any disclaimer, the term of this patent is extended or adjusted under 35 U.S.C. 154(b) by 0 days.

(21) Appl. No.: 17/477,066

(22) Filed: Sep. 16, 2021

(65) Prior Publication Data
US 2022/0081358 A1   Mar. 17, 2022

Related U.S. Application Data

(60) Provisional application No. 62/706,918, filed on Sep. 17, 2020.

(51) Int. Cl.
| | |
|---|---|
| *C03C 23/00* | (2006.01) |
| *C03C 17/00* | (2006.01) |
| *C03C 17/32* | (2006.01) |

(52) U.S. Cl.
CPC ........ *C03C 23/0025* (2013.01); *C03C 17/002* (2013.01); *C03C 17/32* (2013.01); *C03C 2217/70* (2013.01)

(58) Field of Classification Search
None
See application file for complete search history.

(56) References Cited

U.S. PATENT DOCUMENTS

2012/0201957 A1* 8/2012 Piombini ............. B23K 26/352
                                                                264/400

FOREIGN PATENT DOCUMENTS

WO    WO-03107041 A2 *  12/2003  ............. C03B 23/02
WO    WO-2009151513 A1 *  12/2009  ............. C03B 23/02

OTHER PUBLICATIONS

CN 108883976 machine translation, Xu et al. Microwave Tempering of the Glass Substrate, Nov. 2018 (Year: 2018).*
CN 109516697 machine translation, Shao Jian-Da et al., Laser Polishing Method of Mobile Phone Display Screen Glass, Mar. 2019 (Year: 2019).*
Y. Bellouard, et al., "Stress-state manipulation in fused silica via femtosecond laser irradiation," *Optica*, vol. 3, No. 12, pp. 1285-1293 (Dec. 2016).
C. Beckmann, et al., "Figure correction of borosilicate glass substrates by nanosecond UV excimer laser irradiation," *Optics Express*, vol. 28, No. 13, pp. 18681-18692 (Jun. 22, 2020).

(Continued)

*Primary Examiner* — Queenie S Dehghan
(74) *Attorney, Agent, or Firm* — John C. Pokotylo; Pokotylo Patent Services

(57) ABSTRACT

A thin glass sheet having a desired surface profile is produced by: (a) receiving information about an actual surface of a thin glass sheet to be processed; (b) receiving information describing the desired surface profile of the thin glass sheet; (c) determining a corrective curvature based on (1) the information describing the actual surface of the thin glass sheet, and (2) the information describing the desired surface profile of the thin glass sheet; (d) determining at least one parameter of at least one glass shaping process; and (e) applying the at least one glass shaping process to the thin glass sheet using the parameter (s). The corrective curvature may be determined using a Laplacian of surface data of the thin glass sheet and the desired surface profile.

15 Claims, 11 Drawing Sheets

(56) References Cited

OTHER PUBLICATIONS

Lord Rayleigh, O.M., "Polishing of Glass Surfaces," *The Proceedings of the Optical Convention*, pp. 73-78 (Messrs. Norgate & Williams, Covent Garden, London, May 30-Jun. 3, 1905).
J. Lambropoulos, "Twyman Effects in Thin Curved Optics," *Proceedings of SPIE, Optifab 2017* vol. 10448 (Rochester, NY, Oct. 16, 2017).
K. Thetpraphi, et al., "Live-Mirror Shape Correction Technology Operated Through Modified Electroactive Polymer Actuators," *Proceedings of SPIE, Electroactive Polymer Actuators and Devices* vol. 10966 (Denver, CO, Mar. 13, 2019).
K. Thetpraphi, et al., "3D-Printed Electroactive Polymer Force-Actuator for Large and High Precise Optical Mirror Applications," *Additive Manufacturing*, vol. 47 (Elservier B.V., Aug. 2, 2021).

\* cited by examiner

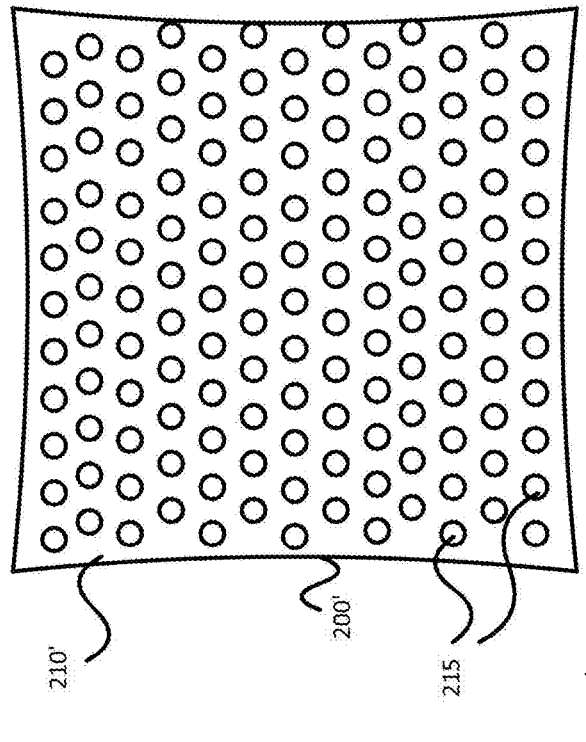
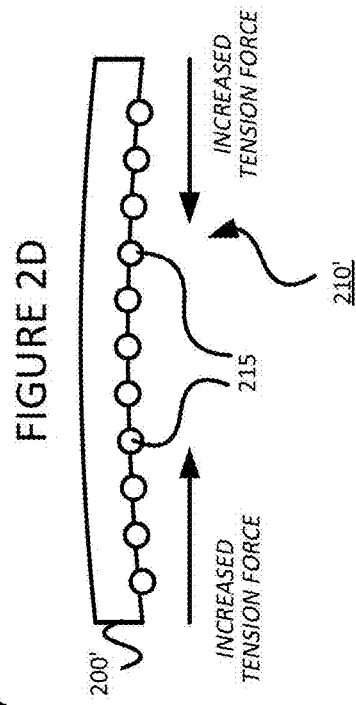
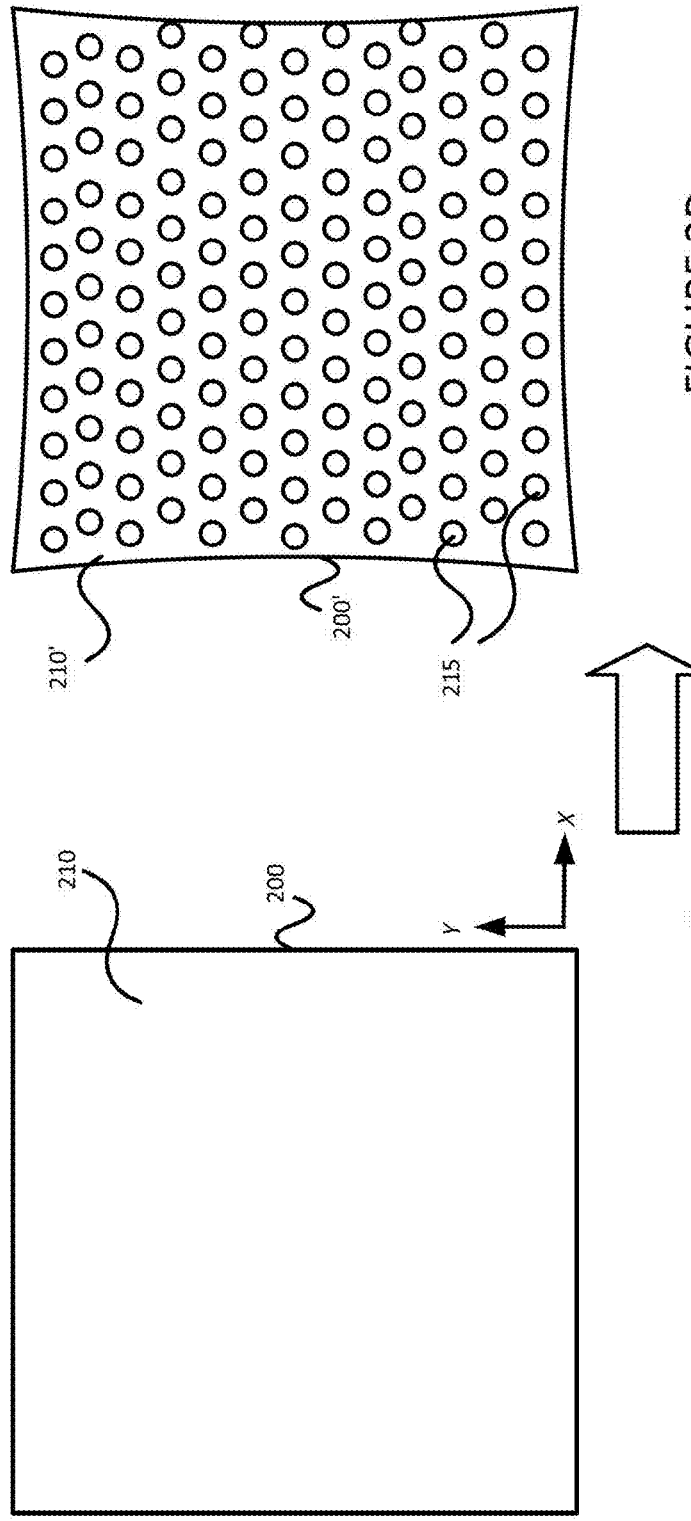
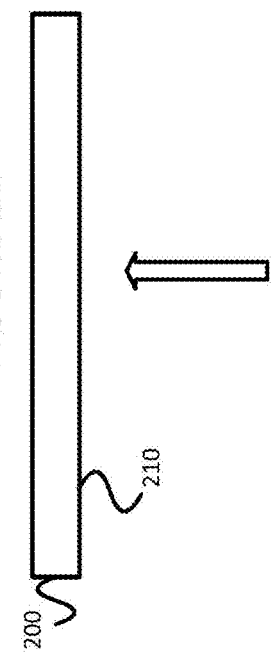

FIGURE4A
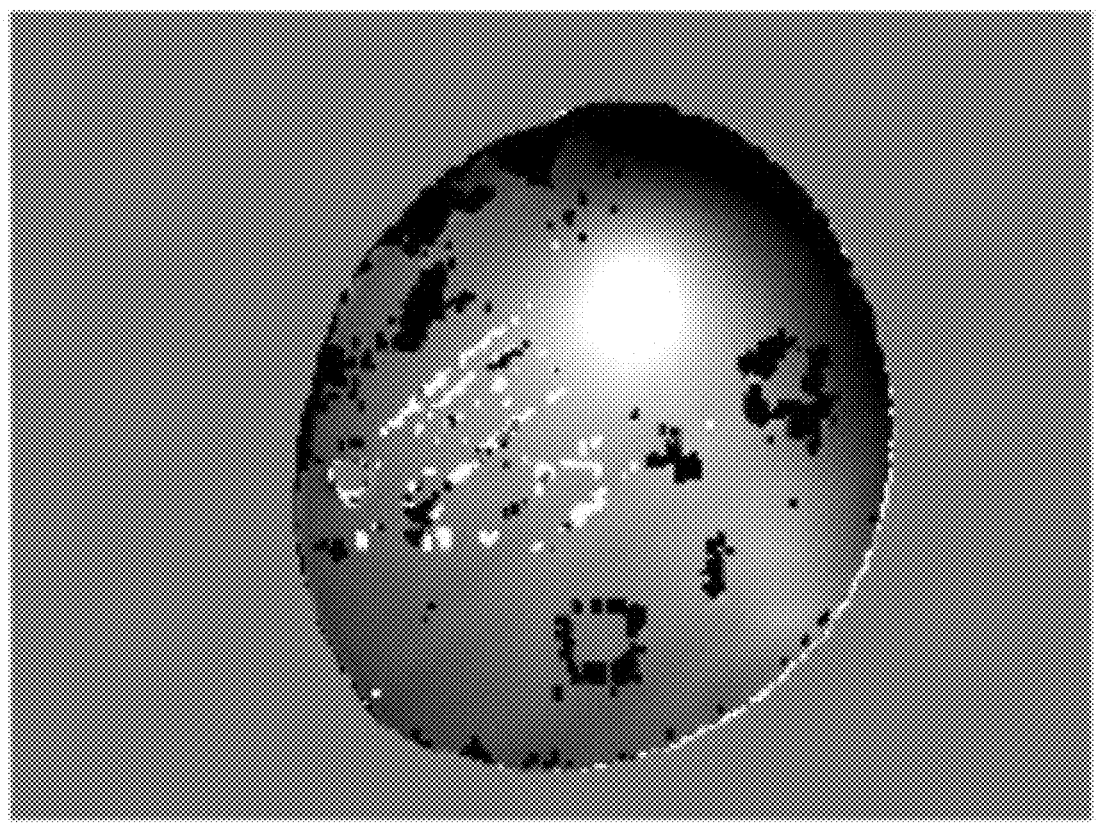
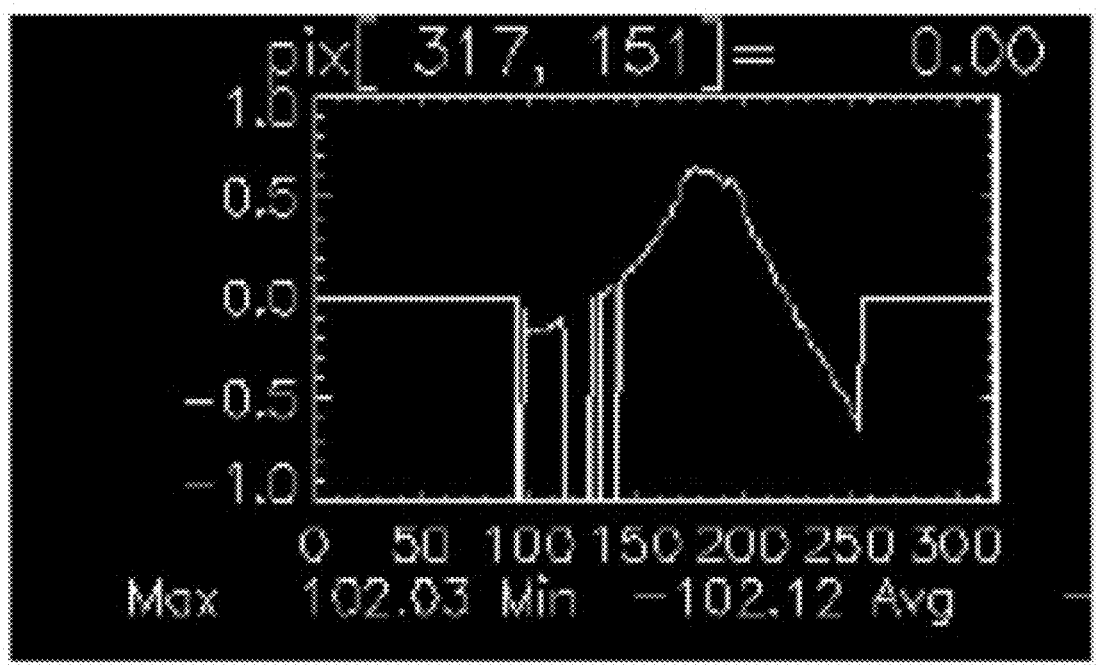
FIGURE4B

FIGURE 5A
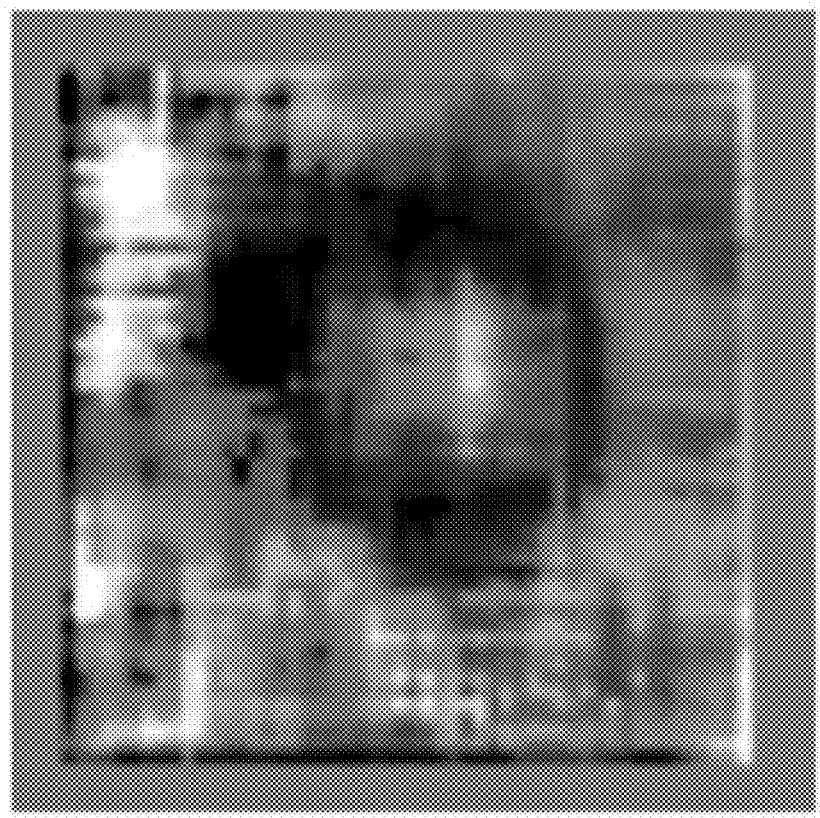
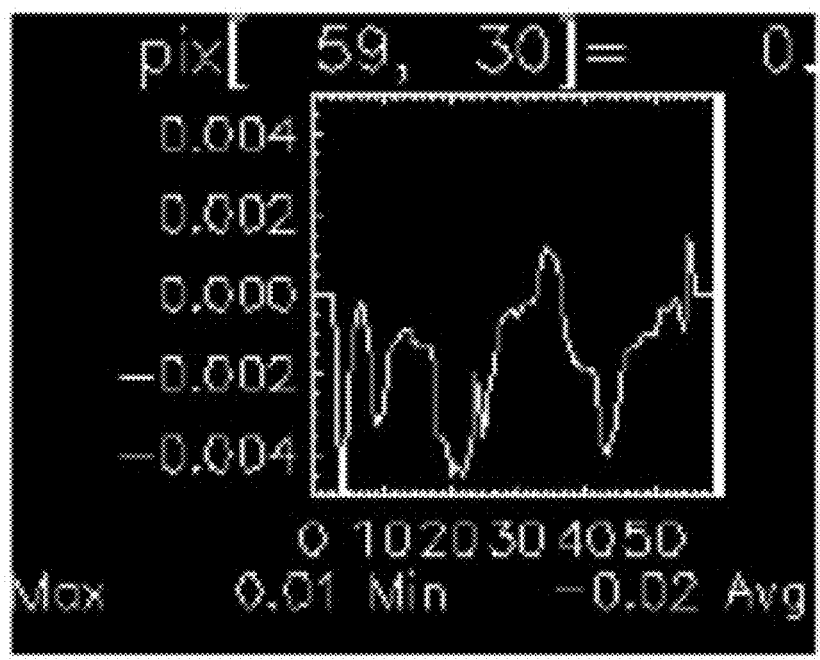
FIGURE 5B

FIGURE 7A
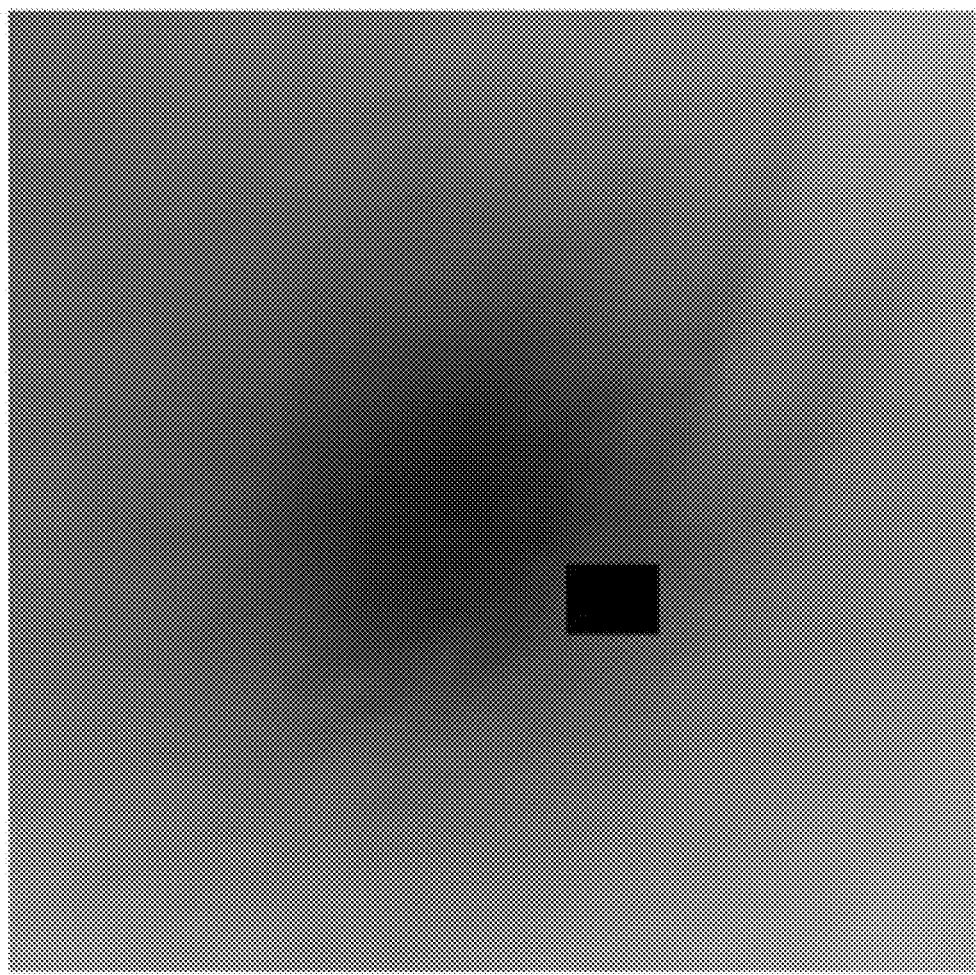
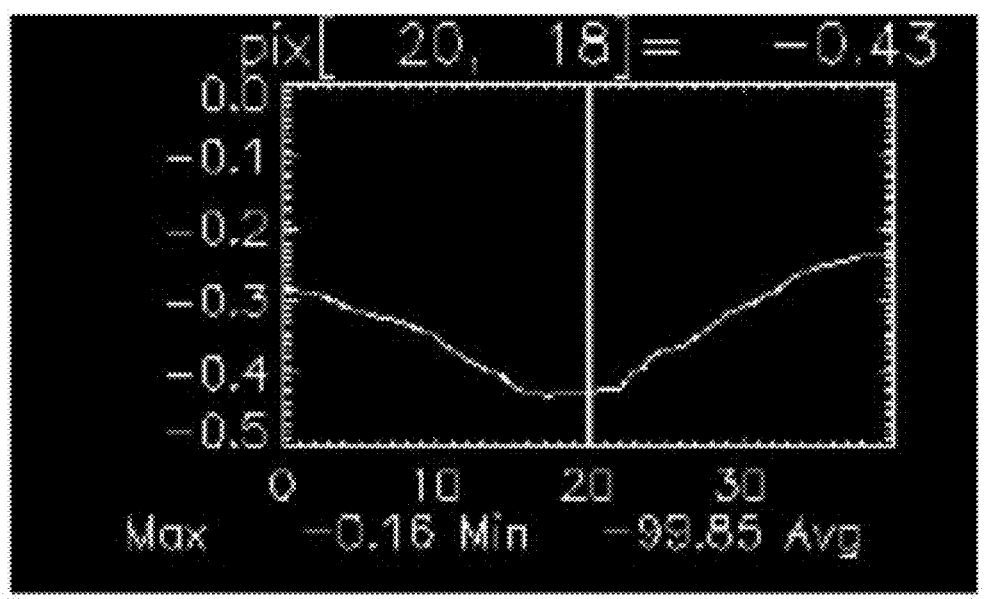
FIGURE 7B

FIGURE 8A
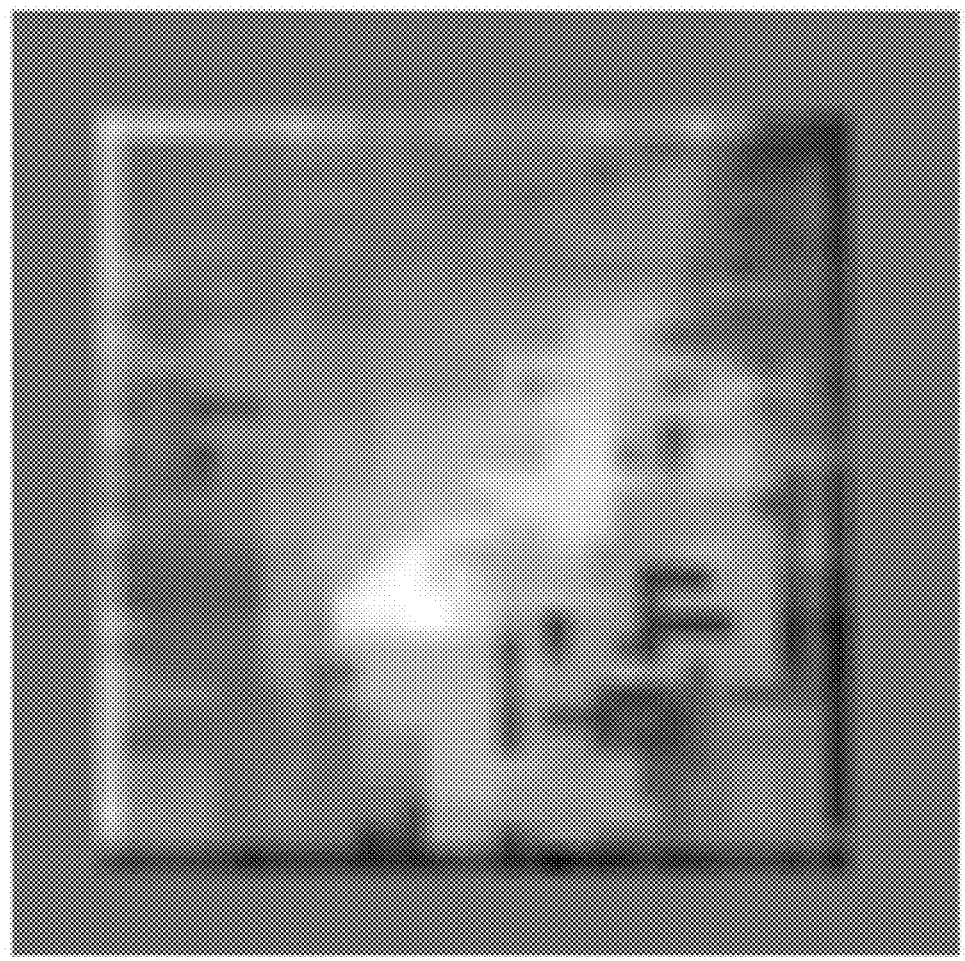
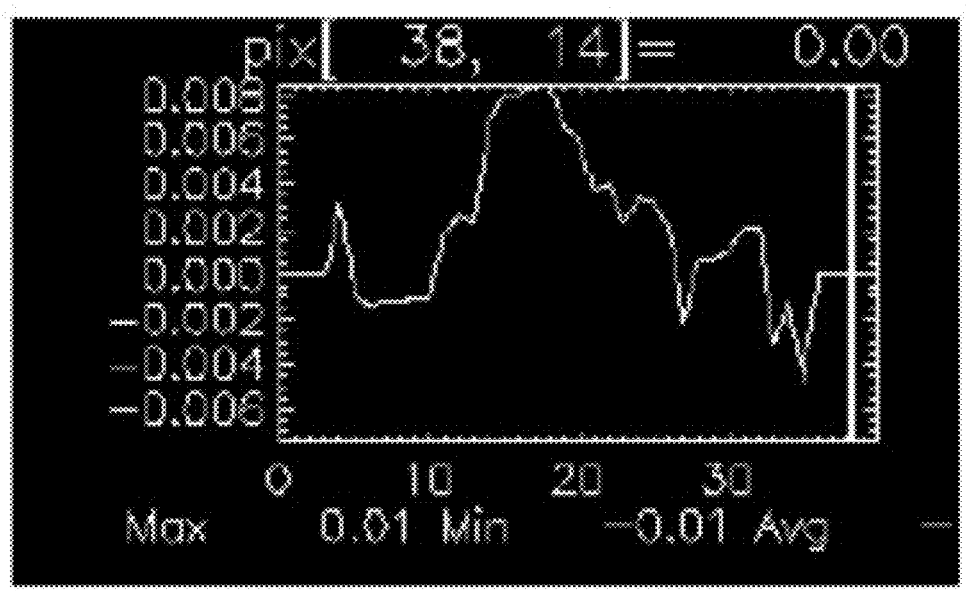
FIGURE 8B

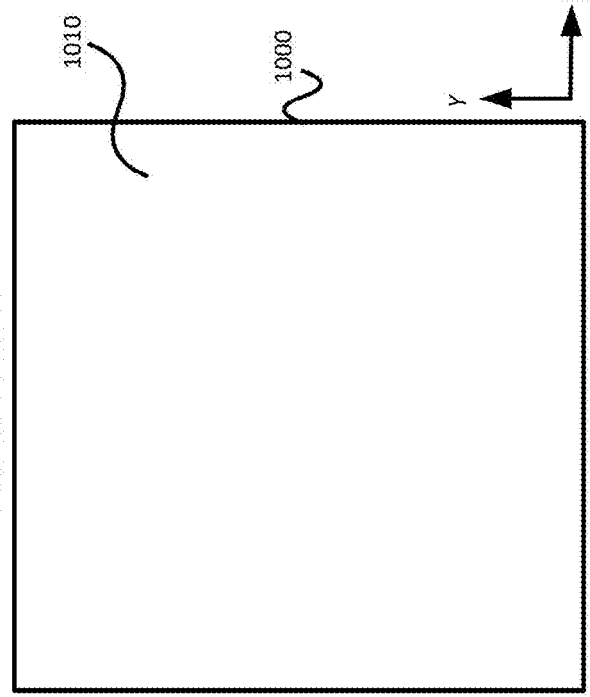
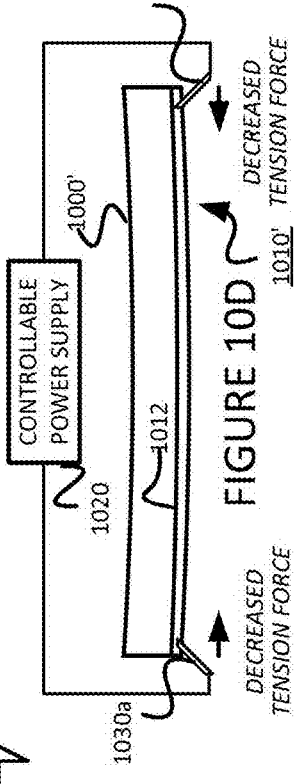
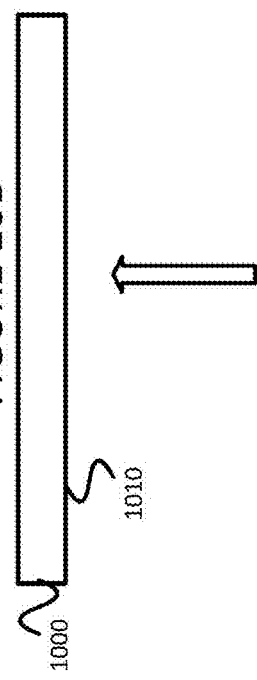
FIGURE 10A
FIGURE 10B
FIGURE 10C
FIGURE 10D
APPLY ELECTROACTIVE POLYMER

NON ABRASIVE, THIN GLASS SHAPING METHODS, SYSTEMS FOR PERFORMING SUCH METHODS, AND THIN GLASS PRODUCED BY SUCH METHODS

§ 0. RELATED APPLICATIONS

This application claims benefit to U.S. Provisional Application Ser. No. 62/706,918, titled "PRECISE THIN GLASS SHAPING USING DETERMINISTIC CURVATURE POLISHING," filed on Sep. 17, 2021, and listing Dr. Jeffrey Richard Kuhn as the inventor (referred to as "the '918 provisional" and incorporated herein by reference). The scope of the present invention is not limited to any requirements of the specific embodiments described in '918 provisional.

§ 1. BACKGROUND OF THE INVENTION

§ 1.1 Field of the Invention

The present invention concerns optical glass components and methods of producing them. In particular, the present invention concerns shaping thin glass.

§ 1.2 Background Information

Conventional polishing technologies correct the glass surface deformation, z(x,y), by removing glass material from the front optical surface. Optical-quality glass surfaces are typically generated by a series of abrasive polishing and careful metrology steps in a costly iterative procedure. Thin, light-weight surfaces are particularly difficult to accurately shape because of substrate deformation during the grinding and polishing process. Thicker large optical surfaces, often used for imaging reflective mirrors, can cost hundreds of thousands of dollars per square meter to manufacture with a conventional polishing process.

§ 1.3 Unmet Needs

In view of the forgoing, it would be useful to correct glass surface deformations, especially surface deformations in thin glass sheets, and/or to impart a desired convexity or concavity onto the glass surface, in a way that avoids the customary and expensive abrasive polishing.

§ 2. SUMMARY OF THE INVENTION

An example method for producing a thin glass sheet having a desired surface profile includes: (a) receiving information about an actual surface of a thin glass sheet to be processed; (b) receiving information describing the desired surface profile of the thin glass sheet; (c) determining a corrective curvature based on (1) the information describing the actual surface of the thin glass sheet, and (2) the information describing the desired surface profile of the thin glass sheet; (d) determining at least one parameter of at least one glass shaping process; and (e) applying the at least one glass shaping process to the thin glass sheet using the determined at least one parameter. In some implementations of the example method, the corrective curvature is determined using a Laplacian of surface data of the thin glass sheet and the desired surface profile of the thin glass sheet. In some implementations of the example method, the information about the actual surface of the thin glass sheet to be processed is received by measuring with an interferometer, the surface of the thin glass sheet to be processed.

In some implementations of the example method, the at least one glass shaping process is laser melting and the at least one parameter is at least one of (A) laser power, (B) laser wavelength, (C) laser spot size, and (D) laser dwell time. Alternatively, or in addition, in some implementations of the example method, the at least one glass shaping process is roughening and the at least one parameter is at least one of (A) trough depth and (B) trough width. Alternatively, or in addition, in some implementations of the example method, the at least one glass shaping process is adhesive deposition and the at least one parameter is at least one of (A) adhesive area, (B) adhesive strength, (C) adhesive shrinkage, and (D) adhesive type. Alternatively, or in addition, in some implementations of the example method, the at least one glass shaping process is electro-active polymer deposition and the at least one parameter is polymer selection.

As a result, a thin glass product having residual surface shape errors that have an rms size no larger than 50 nm over 1-10 cm length scales may be produced. In some cases, the thin glass product has a front surface area of at least one meter$^2$. In some cases, the thin glass product has a thickness of less than 5 mm, and preferably, from 2 mm to 4 mm.

An example apparatus for producing a thin glass sheet having a desired surface profile, the apparatus includes: (a) at least one input for receiving (1) information about an actual surface of a thin glass sheet to be processed, and (2) information describing the desired surface profile of the thin glass sheet; (b) at least one processor; and (c) a storage device storing processor executable code which, when executed by the at least one processor, causes the at least one processor to (1) determine a corrective curvature based on (i) the information describing the actual surface of the thin glass sheet, and (ii) the information describing the desired surface profile of the thin glass sheet, and (2) determine at least one parameter of at least one glass shaping process. In some implementations, the apparatus also includes means for applying the at least one glass shaping process to the thin glass sheet using the determined at least one parameter.

In some implementations of the example apparatus, the means for applying the at least one glass shaping process to the thin glass sheet using the determined at least one parameter includes (1) a three-dimensional printer gantry, and (2) a laser.

In some implementations of the example apparatus, the means for applying the at least one glass shaping process to the thin glass sheet using the determined at least one parameter includes (1) a three-dimensional printer gantry, and (2) a grinding tool.

In some implementations of the example apparatus, the means for applying the at least one glass shaping process to the thin glass sheet using the determined at least one parameter includes (1) a three-dimensional printer gantry, (2) an adhesive reservoir, and (3) an adhesive deposit head.

In some implementations of the example apparatus, the means for applying the at least one glass shaping process to the thin glass sheet using the determined at least one parameter includes (1) a three-dimensional printer gantry, (2) a polymer reservoir, and (3) a polymer deposit head.

§ 3. BRIEF DESCRIPTION OF THE DRAWINGS

FIGS. 2A-2D illustrate an example laser surface melting process, which may be used to implement at least a portion of the example method of FIG. 1.

FIG. 4A is a photograph of optical glass surface change after 1 cm square melt pattern created on glass, and FIG. 4B is an interferometric measurement of the optical glass surface change after the 1 cm square melt pattern created on the glass.

FIG. 5A is an image showing the 1 cm square box of the laser melt pattern and the local Laplacian computed around the laser burn, and FIG. 5B illustrates a scan of the value of the Laplacian.

FIG. 7A is an interferogram $z(x,y)$ of a change in the reflective surface caused by grinding of the back surface of a thin glass sheet. FIG. 7B is a horizontal scan (in micron units) depicting the resulting negative surface displacement of the thin glass sheet.

FIG. 8A is an image of a Laplacian of FIG. 7A, and FIG. 8B is a horizontal scan illustrating positive curvature created by roughening the work surface of the thin glass sheet.

FIGS. 10A-10D illustrate an example electro-active polymer (EAP) deposition process, which may be used to implement at least a portion of the example method of FIG. 1.

§ 4. DETAILED DESCRIPTION

The present disclosure may involve novel methods, apparatus, and/or systems for performing non-abrasive, thin glass shaping, as well as the product of such methods. The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present invention is not intended to be limited to the embodiments described and shown, and the inventor regards his invention as any patentable subject matter described.

§ 4.1 DEFINITIONS

The meaning of "thin glass" is glass that is less than 5 mm thick, and preferably from 2 mm to 4 mm thick.

The term "optical component" is intended to include reflective image forming flat or curved linear surfaces or two-dimensional surfaces made from "glassy" or "specular" reflective materials. An "image quality optical component" refers to an optical component upon which an image can be formed.

The "back surface" (also referred to as "working surface") of a sheet of glass in the context of an optical component or an image quality optical component is the surface opposite the surface intended to receive incident light (also referred to as "front surface" or "mirror surface").

The term "non-abrasive" is intended to refer to a process that does not abrade or directly polish (remove material from) the mirror (or front) surface of an optical component.

§ 4.2 Example Methods for Non-Abrasive Thin Glass Shaping

Figure 1:
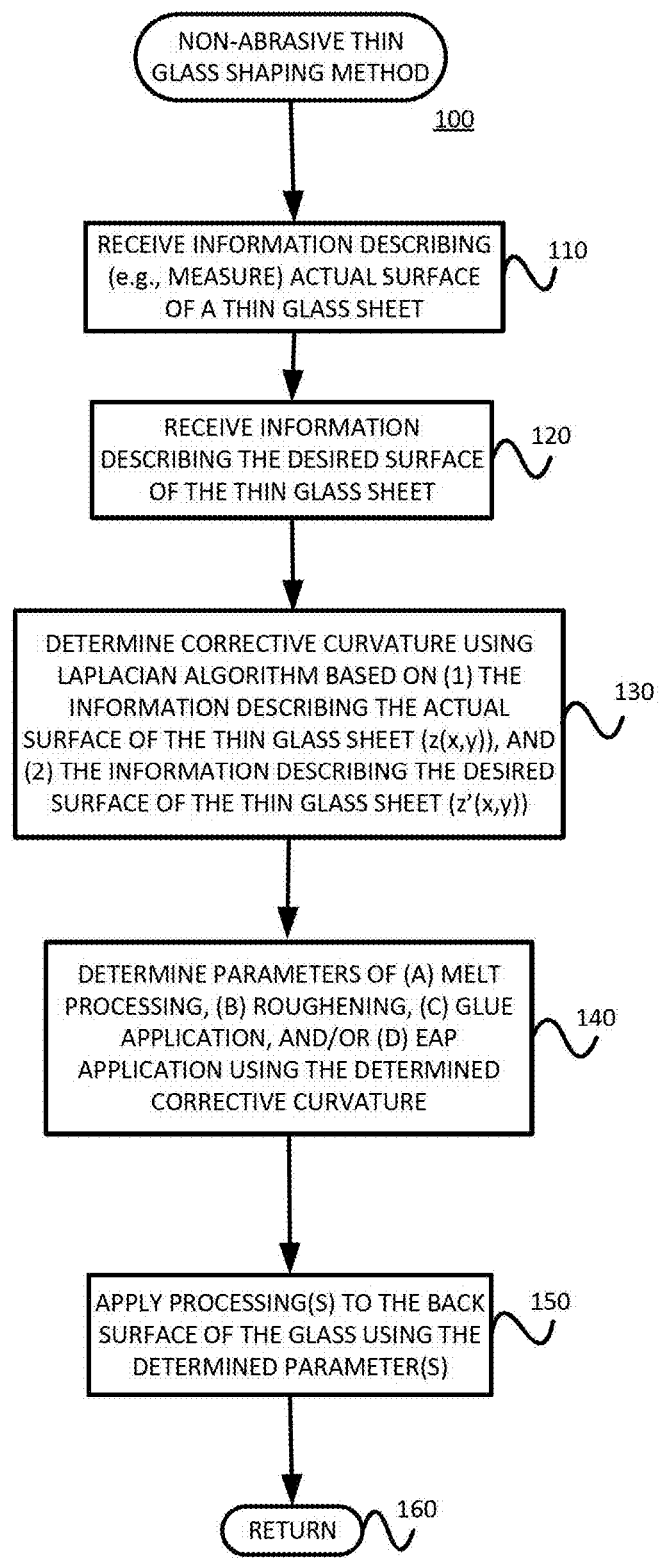
FIG. 1 is a flow diagram of an example method for providing non-abrasive, thin glass shaping in a manner consistent with the present application.

FIG. 1 is a flow diagram of an example method 100 for providing non-abrasive, thin glass shaping in a manner consistent with the present application. As shown, the example method 100 receives (e.g., measures) information about the actual surface of a thin glass sheet to be processed. (Block 110) The example method 100 also receives information describing a desired surface of the thin glass sheet. (Block 120) Next, the example method 100 determines a corrective curvature using a Laplacian algorithm (example computer code is provided in § 4.5, below) based on (1) the information describing the actual surface of the thin glass sheet, and (2) the information describing the desired surface of the thin glass sheet. (Block 130) Next, the example method 100 determines one or more parameters of a glass shaping process or processes (e.g., melt processing, roughening, adhesive deposition, and/or EAP deposition) to be applied to the thin glass sheet using the corrective curvature determined. (Block 140) The glass shaping process or processes is then applied to the thin glass sheet using the determined parameter(s) (Block 150) before the example method 100 is left (Node 160).

The example method 100 may be used to shape a sheet of thin glass. This glass may be, for example, soda-lime (float "window") glass less than 5 mm thick, and preferably from 2 mm to 4 mm thick. As one example, Borofloat (3.3 mm) borosilicate flat glass is preferred because its initial flatness and uniformity are better than ordinary soda-lime glass. Typical glass begins with root-mean-square (rms) surface shape errors on transverse surface scales of 1 cm to 10 cm of up to 5 micron. After applying the curvature polishing technology consistent with the present application the mirror surface shape error is no more than 50 nm. Currently thin Borofloat glass sheets up to about 2 m by 4 m in size are available from Schott AG of Mainz, Germany.

Referring back to block 110 and 120, in one example implementation, interferometer measurements of Borofloat glass surfaces are used to obtain surface displacement functions, $z(x,y)$ that reveal the departure (also referred to as "sag") of the actual surface from the desired surface. Referring back to block 130, in some example embodiments of the example method 100, the typical range in the local curvature of the thin glass sheet is obtained by empirically obtaining the Laplacian (i.e., $\nabla^2 z(x,y)$) from the interferometric $z(x,y)$ digital surface function data. When this function is evaluated and discretized, we refer to this as the required curvature correction map $C(x,y)$. The curvature correction has natural units of curvature (reciprocal length or 1/meter) per area of one pixel in the discretized x-y domain of $C(x,y)$. In one implementation of the curvature algorithm described in § 4.5 below, a curvature map includes many geometric "circular spots" in a diagram that shows how and where the curvature techniques are to be applied to the work surface. This diagram identifies the radius and position of each spot of the four curvature correction applications. Within each spot, a single optimal curvature correction technique is applied. Although "spot" having a "radius" is discussed, it is possible to use other geometric shapes (e.g., regular polygons) or a continuous function $C(x,y)$, having other dimensions instead, or in addition.

Referring back to block 140, four classes of example processes for performing non-abrasive, thin glass shaping, are described in §§ 4.2.1 through 4.2.4 below. The magnitude and sign of the required curvature correction needed to correct the mirror surface to the desired shape may be used to determine the most effective curvature shaping application, or the most effective combination of curvature shaping applications. Curvature changes (e.g., up to a local curvature radius of 10 m) in thin glass can be corrected using the techniques described in this application. These techniques can also be applied to smaller radius optical surfaces to make local curvature corrections in scenarios in which the overall glass shape is generated by other means (e.g., kiln heating and slumping). The final shape change created by these techniques can be used to provide the fine correction needed to produce "image quality" optical surfaces. Further note that a local curvature change (and local curvature changes, collectively) affects the shape globally (which is a characteristic of the second derivative in the standard definition of the Laplacian function).

§ 4.2.1 Bead Melting

The present inventor has found that the Borofloat glass surface curvature corrections are within the dynamic range of the curvature that can be generated on the mirror surface of thin glass sheets by laser melting on the working surface. Areas in the curvature map that require negative curvature with a value corresponding to a local radius of curvature density that is less than 0.05 $m^{-1}/mm^2$ can be corrected with laser power transmitted to the working surface. In an example embodiment using 10 µm wavelength lasers, the laser power does not penetrate to the mirror surface of the glass sheet. A negative curvature (that is, convexity) on the mirror surface is generated by a positive change (that is, increase) in the surface tension on the working surface.

FIGS. 2A-2D illustrate an example laser surface melting process, which may be used to implement at least a portion of the example method of FIG. 1. These figures are not to scale. FIGS. 2A and 2B are plan and side views, respectively, of a thin glass sheet 200. A surface melting laser (now shown) is to be applied to the working surface 210 of the thin glass sheet 200.

FIGS. 2C and 2D are plan and side views, respectively, of the resulting thin glass sheet 200'. As shown, beads 215 are formed on (or partially embedded in) the working surface 210'. This increases the surface tension on the working surface 210' (relative to the mirror surface), imparting a convex shape. As noted above, FIGS. 2A-2D can be used to illustrate global (that is, across the entire thin glass sheet) changes, or local changes.

For "negative" curvature corrections on the curvature correction map $C(x,y)$, laser power from a 40 W $CO_2$ (10 micron wavelength and 400 micron spot size) industrial laser is applied locally using a 3D printer gantry (such as, for example, those available from HyRel Inc. of Norcross, GA) to control the position and motion (dwell time) of the laser. For 3.3 mm thickness borofloat glass, the induced local curvature density per $mm^2$ using 0.02 s dwell time per linear mm is 1/R where R (the local curvature radius) is 20 m. For thicker or thinner glass, the induced curvature decreases with increasing thickness, and increases with decreasing thickness. For longer dwell times up to the fracture limit of the glass, the curvature increases (R decreases). Similarly, for shorter dwell times, the curvature decreases (R increases).

The term "bead" is used because the laser melting causes a roughly spherical bead to be formed, some of which may be embedded within the working surface of the glass.

Figure 3:
FIG. 3 illustrates a glass substrate undergoing an example surface melt treatment using a high-power $CO_2$ (10 micron wavelength) computer-controlled laser.

FIG. 3 is a photograph illustrating a glass substrate undergoing surface melt treatment with high-power $CO_2$ (10 micron wavelength) computer-controlled laser.

FIG. 4A illustrates an interferometric measurement of optical glass surface change after 1 cm square melt pattern created on a thin glass sheet. FIG. 4B is a scan (in micron units) illustrating the change measured across a horizontal scan that includes the 1 cm square. Notice that a 1 micron peak-valley shape change is created.

FIG. 5A illustrates the local Laplacian computed around the 1 cm square box of the laser melt pattern. FIG. 5B illustrates a horizontal scan (or cut) of the value of the Laplacian. FIGS. 5A and 5B are expanded views from the interferometer data in FIGS. 4A and 4B. Note that the reflective front surface shows positive deformation and (for this coordinate system) negative curvature.

§ 4.2.2 Roughening

The present inventor has found that the positive curvature corrections required by Borofloat glass are often within the dynamic range of the positive curvature that can be generated on the mirror surface of thin glass sheets by abrasive disturbance (creating positive local curvature) transmitted to the working surface. The positive curvature change on the mirror surface is generated by negative changes in the work surface tension.

Figure 6A:
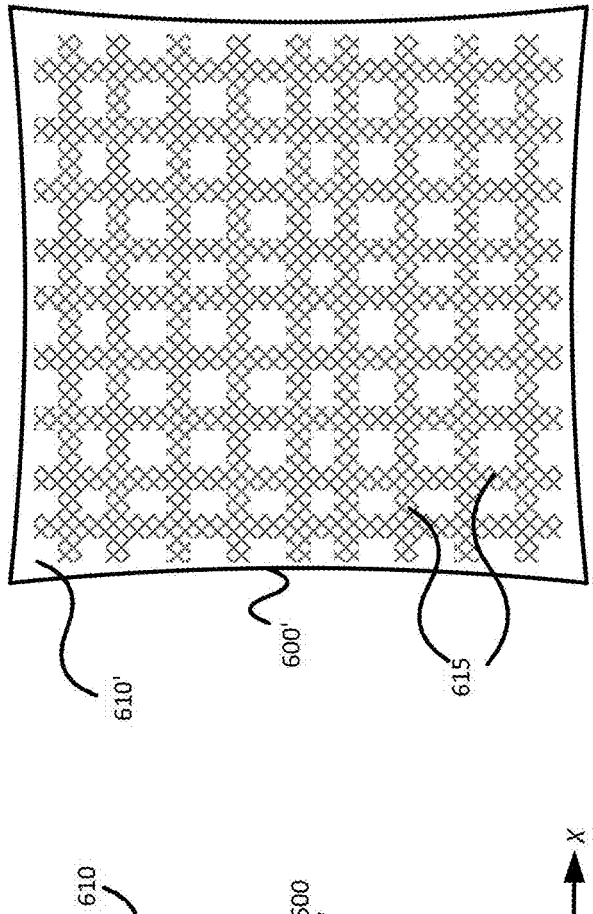
FIGS. 6A-6D illustrate an example roughening process, which may be used to implement at least a portion of the example method of FIG. 1.
Figure 6B:
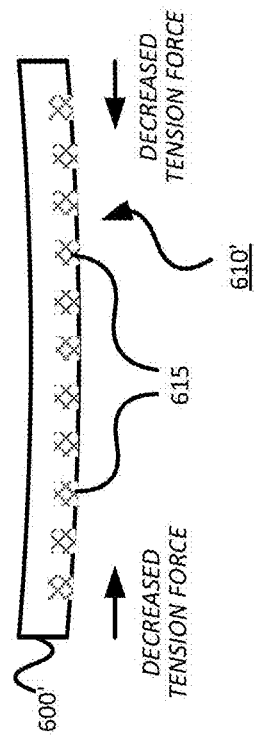

FIGS. 6A-6D illustrate an example roughening process, which may be used to implement at least a portion of the example method of FIG. 1. These figures are not to scale. FIGS. 6A and 6B are plan and side views, respectively, of a thin glass sheet 600. A roughening tool (now shown) is to be applied to the working surface 610 of the thin glass sheet 600.

Figure 6C:
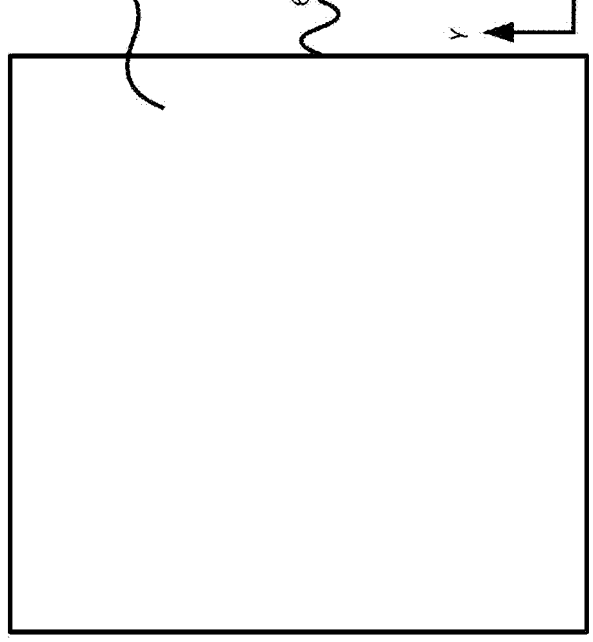
Figure 6D:
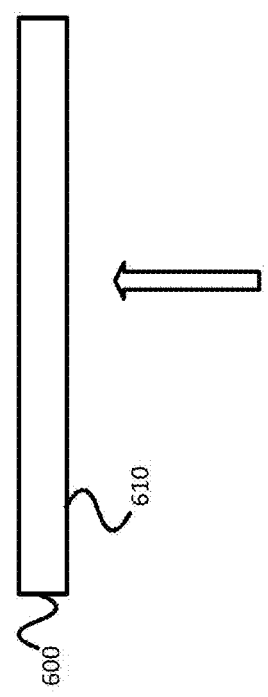

FIGS. 6C and 6D are plan and side views, respectively, of the resulting thin glass sheet 600'. As shown, roughening spots, shapes, and/or patterns 615 are formed on the working surface 610'. This decreases the surface tension on the working surface 610' (relative to the mirror surface), imparting a concave shape. As noted above, FIGS. 6A-6D can be used to illustrate global (that is, across the entire thin glass sheet) changes, or local changes.

For areas on the curvature map $C(x,y)$ that require positive curvature correction and that have a curvature density magnitude of less than 0.05 $m^{-1}/mm$, a roughening is applied to the work glass surface corresponding to the curvature map spot. In one example embodiment, a "conical Dremel, Inc. tool" rotating at 10,000 RPM with 1 N of downward force is applied to the curvature map spot (or area). In one example embodiment of this technique, a 3D printer gantry (such as, for example, those available from HyRel Inc. of Norcross, GA) controls the dwell time and location of the tool. A grinding contact moves with a speed of 10 cm/s and generates a local curvature density of 0.05 $m^{-1}/mm^2$. In this example roughening embodiment, the induced curvature density is insensitive to 50% variations in the roughening head velocity or rotation speed. It is believed that the curvature density will be sensitive to the depth and/or width of the resulting trough. The area of the trough(s) is mainly controlled by the pattern used by the printer gantry.

FIG. 7A illustrates an interferogram z(x,y) (top) of reflective surface change caused by grinding of back surface. A bad pixel from the interferometry is visible near the center of the image. FIG. 7B is a horizontal scan (in micron units), which shows negative surface displacement.

FIG. 8A is an image from a Laplacian of FIG. 7A, and FIG. 8B is a horizontal scan illustrating showing positive curvature created by glass work surface roughening.

4.2.3 Adhesive Deposition

Figure 9C:
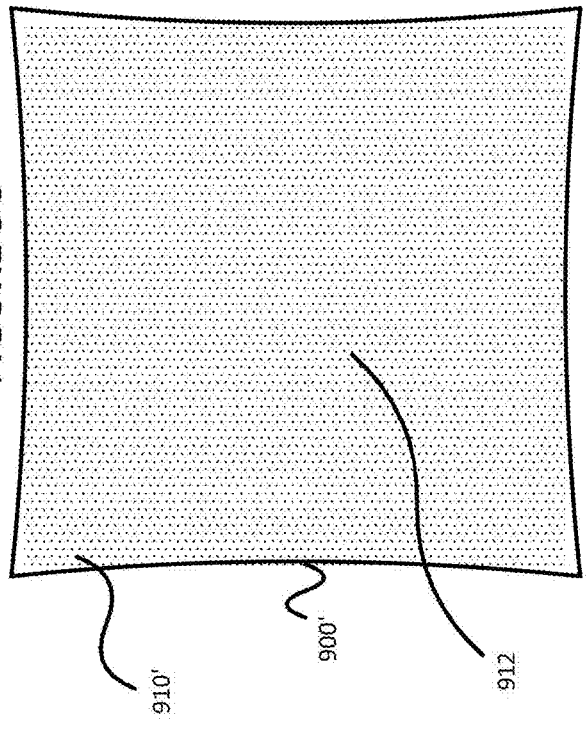
FIGS. 9A-9D illustrate an example adhesive deposition process, which may be used to implement at least a portion of the example method of FIG. 1.
Figure 9D:
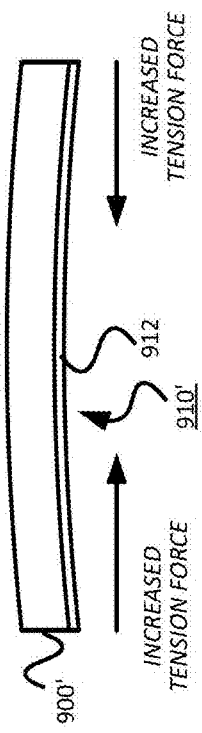
Figure 9A:
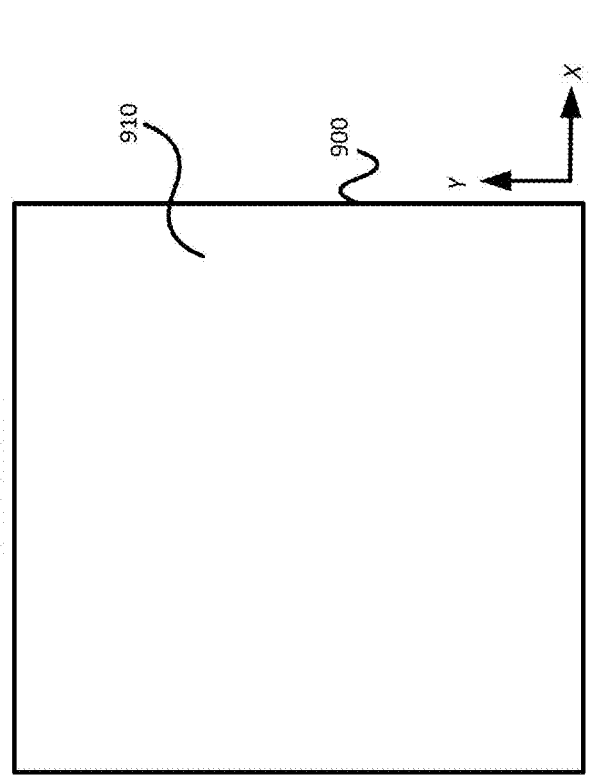
Figure 9B:
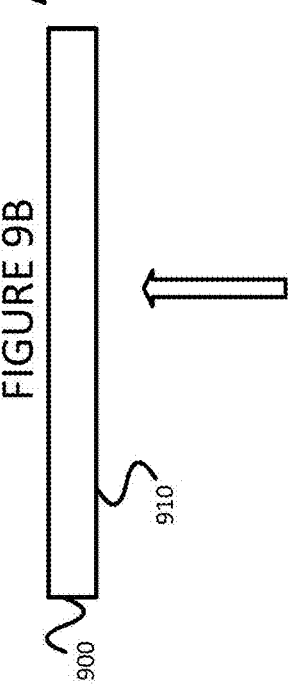

FIGS. 9A-9D illustrate an example adhesive deposition process, which may be used to implement at least a portion of the example method of FIG. 1. These figures are not to scale. FIGS. 9A and 9B are plan and side views, respectively, of a thin glass sheet 900. An adhesive is to be applied to the working surface 910 of the thin glass sheet 900.

FIGS. 9C and 9D are plan and side views, respectively, of the resulting thin glass sheet 900'. As shown, spots, shapes, or patterns 912 of adhesive are deposited on the working surface 910'. This increases the surface tension on the working surface 910' (relative to the mirror surface), imparting a convex shape. As noted above, FIGS. 9A-9D can be used to illustrate global (that is, across the entire thin glass sheet) changes, or local changes.

Areas in the curvature map that require negative curvature with a magnitude corresponding to a local radius of curvature density greater than 0.05 $m^{-1}/mm^2$ can be efficiently corrected with an epoxy adhesive applied to the working surface. The negative curvature on the mirror surface is generated by a positive change in the surface tension due to the local adhesive spot on the back working surface.

Positive surface tension for large curvature densities is generated by applying an adhesive chemical to the working surface aligned with the derived curvature map. In one example embodiment, "5-minute Brand" epoxy provides this positive tension change using a 3D printer gantry (such as, for example, those available from HyRel, Inc. of Norcross, GA) to control the location of the adhesive on the working surface corresponding to the curvature map. A 1 mm diameter spot that is 500 microns thick produces a curvature density of 0.05 $m^{-1}/mm^2$ after room temperature curing for one hour. The amount of curvature density produced might be changed by changing one or more of (a) the area over which the adhesive is deposited, (b) the strength of the adhesive used, and (c) the amount of shrinkage due to curing of the particular adhesive used.

§ 4.2.4 Electro-Active Polymer Deposition

The present inventor has found that Electro-Active Polymer (EAP) deposition has been used on soda-lime glass sheets.

FIGS. 10A-10D illustrate an example electro-active polymer (EAP) deposition process, which may be used to implement at least a portion of the example method of FIG. 1. These figures are not to scale. FIGS. 10A and 10B are plan and side views, respectively, of a thin glass sheet 1000. An EAP is deposited onto the working surface 1010 of the thin glass sheet 1000.

FIGS. 10C and 10D are plan and side views, respectively, of the resulting thin glass sheet 1000'. As shown, spots, shapes, or patterns 1012 are formed on the working surface 1010'. A controllable power supply 1020 can apply a voltage different across one or more pairs of electrodes 1030a and 1030b (or one or more electrodes and a grounding plate). This decreases the surface tension on the working surface 1010' (relative to the mirror surface), imparting a concave shape. As noted above, FIGS. 10A-10D can be used to illustrate global (that is, across the entire thin glass sheet) changes, or local changes.

Vacuum deposition or 3D printer application of a conductive electrode on the work surface, followed by 100-500 micron thickness EAP, followed by deposition of a conductive electrode on the EAP exposed surface, allows a variable negative surface tension to be applied to the glass work surface. In one example embodiment, the electrode is a vacuum deposited or sputtered gold coating of 100 nm thickness. In this embodiment, the EAP is a ter-polymer. (See, e.g., the document, K. Thetpraphi et al., "Surface Correction Control Based on Plasticized Multilayer P(VDF-TrFE-CFE) Actuator—Live Mirror," *Adv. Opt. Mater.*, vol. 1900210, p. 1900210, 2019 (incorporated herein by reference).) In this example embodiment, electrical contact to the glass and surface electrodes is provided by conductive copper tape. A voltage of 1000 v is applied using a standard low-current high voltage laboratory supply between the electrodes generates negative curvature density on the mirror surface of a 3.3 mm thick borofloat glass of 0.01 $m^{-1}/mm^2$. In this embodiment a 3D printer (such as, for example, those available from HyRel Inc. of Norcross, GA) is used to apply the EAP with an ink-jet mechanism (not shown). The EAP and glass is cured at 100° C. for 3 hours before the surface electrode is applied. When between 500-2000 V is applied across the electrodes, the induced mirror surface curvature is approximately a quadratic function of the applied voltage.

Steerable mirrors that move with respect to gravity may use dynamic EAP work-surface stress that is created by a secondary global voltage-tunable EAP layer sandwiched against the work surface.

§ 4.3 Example Apparatus for Non-Abrasive Thin Glass Shaping

Figure 11:
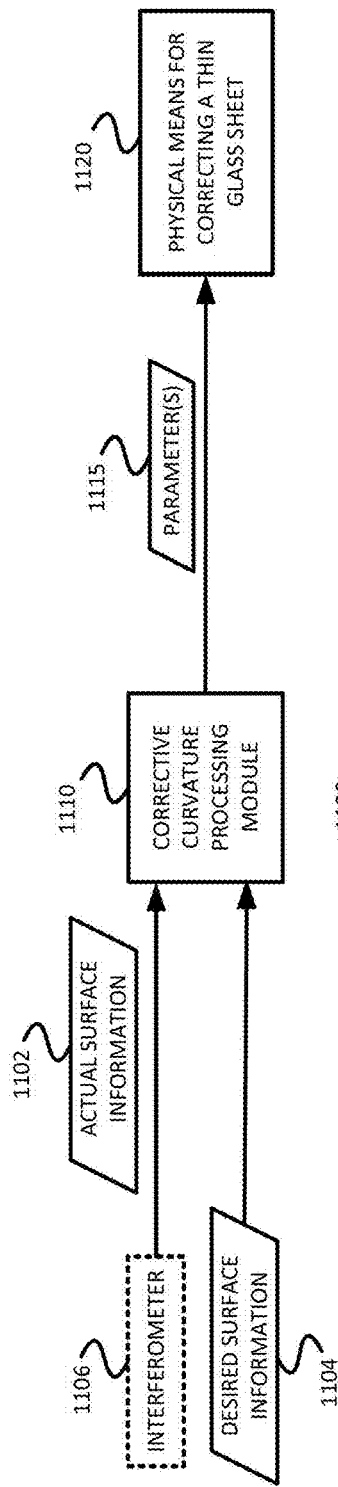
FIG. 11 is a block diagram of an example system which may be used to perform the example method of FIG. 1.

FIG. 11 is a block diagram of an example system 1100 which may be used to perform the example method of FIG. 1. The example system 1100 includes a corrective curvature processing module 1110 and physical means for correcting a thin glass sheet 1120. The corrective curvature processing module 1110 receives, as input, information describing an actual surface of a thin glass sheet 1102 and information describing a desired surface of the thin glass sheet 1104. (Recall, e.g., blocks 110 and 120 of FIG. 1.) As shown, the information 1102 may be provided as an output from an interferometer 1106. The corrective curvature processing module 1110 determines a corrective curvature based on (1) the information describing the actual surface of the thin glass sheet, and (2) the information describing the desired surface of the thin glass sheet. (Recall, e.g., block 130 of FIG. 1.) The corrective curvature processing module 1110 may also determine one or more parameters of one or more thin glass shaping process(es). (Recall, e.g., block 140 of FIG. 1.) This parameter(s) 1115 is output from the corrective curvature processing module 1110 and provided as input to the physical means for correcting a thin glass sheet 1120. The physical means for correcting a thin glass sheet 1120 then applies one or more processes to the back surface of the thin glass sheet using the determined parameter(s). (Recall, e.g., block 150 of FIG. 1, as well as the processes described in §§ 4.2.1-4.2.4 above.)

Figure 12:
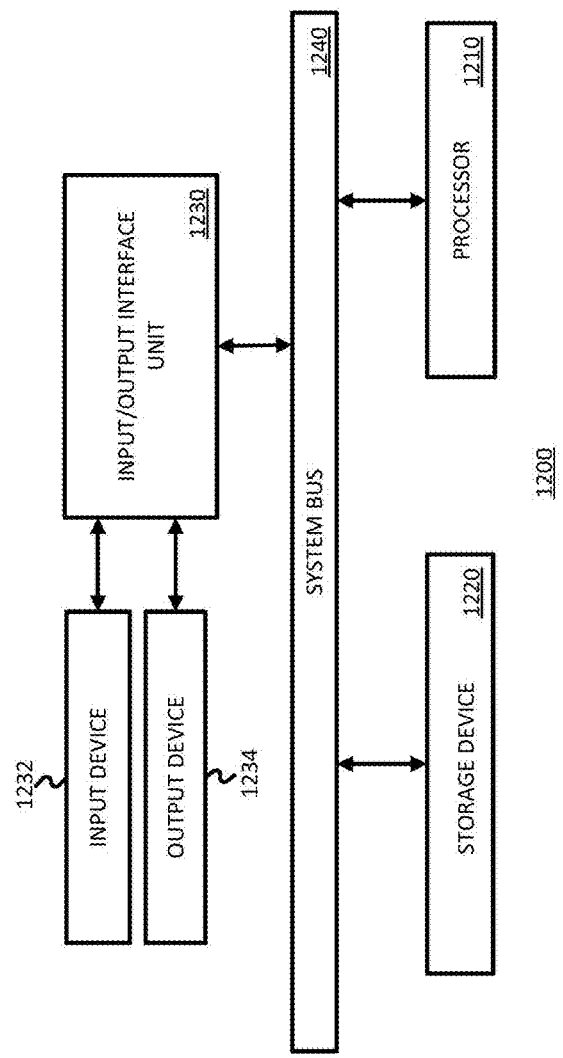
FIG. 12 is a block diagram of an example machine 1200 that may perform one or more of the example methods described, and/or store information used and/or generated by such methods.

FIG. 12 is a block diagram of an example machine 1200 that may perform one or more of the example methods described, and/or store information used and/or generated by such methods. Referring to FIG. 11, the example machine 1200 may be used to implement the corrective curvature processing module 1110 and may constitute at least a part of the physical means for correcting a thin glass sheet. The exemplary machine 1200 includes one or more processors 1210, one or more input/output interface units 1230, one or more storage devices 1220, and one or more system buses and/or networks 1240 for facilitating the communication of information among the coupled elements. One or more input devices 1232 and one or more output devices 1234 may be coupled with the one or more input/output interfaces 1230. The one or more processors 1210 may execute machine-executable instructions (e.g., IDL, C or C++ running on the Linux operating system widely available from a number of vendors) to effect one or more aspects of the present disclosure. At least a portion of the machine executable instructions may be stored (temporarily or more permanently) on the one or more storage devices 1220 and/or may be received from an external source via one or more input interface units 1230. The machine executable instructions may be stored as various software modules, each module performing one or more operations. Functional software modules are examples of components, which may be used in the apparatus described.

In some embodiments consistent with the present disclosure, the processors 1210 may be one or more microprocessors and/or ASICs. The bus 1240 may include a system bus. The storage devices 1220 may include system memory, such as read only memory (ROM) and/or random access memory (RAM). The storage devices 1220 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program, which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present disclosure (or components or modules thereof) might be implemented as stored program instructions executed by a processor.

§ 4.4. Example of Image Quality Glass Produced by Example Thin Glass Shaping Methods The resulting convex or concave glass optical components produced by any of the foregoing methods have a number of useful applications. For example, such optical components may be used in (A) free-space optical communication, (B) ground-station satellite communication, (C) general remote sensing optical/infrared imaging systems, (D) astronomical and ultra-large remote sensing optical imaging systems, (E) space-based, light-weight, optical imaging systems; (F) wafer and substrate polishing for semiconductor (e.g., silicon-based, germanium-based, gallium arsenide-based, etc.) applications, and/or (G) precision thin flat glass for large panel displays.

The thin glass sheet may have a surface area up to and including surfaces of 1 m² and more. Indeed, the surface size is mainly limited by size limitations of the 3D printer gantry used. The resulting thin glass should be less than 5 mm thick, and preferably from 2 mm to 4 mm thick. The curvature polishing technique can correct surface curvature errors that are as large as 0.2 $m^{-1}$ on thin glass, leaving residual surface shape errors that have an rms size no larger than 50 nm over 1-10 cm length scales.

§ 4.5 REFINEMENTS, ALTERNATIVES AND EXTENSIONS

Large-scale curvature of the optical surface can be created by the mechanical truss that supports the glass and by gravitational deformation of this sheet against the mechanical truss where it contacts the glass surface.

The large-scale glass curvature that is necessary for optical focusing and imaging may be generated by initially slumping the glass using a kiln and mold or a pressure-controlled deterministic kiln slumping process.

Referring back to block 130 of FIG. 1, the corrective curvature may be determined using the Interactive Data Language (IDL) code set forth in this section. The following primitive IDL procedures are used for demonstrating curvature algorithm as applied to thin glass sheets. The routines are called in the following sequence:

1. Rdglass reads interferometric data z(x,y) for the surface to be examined. Two zygo-format data files may be input and compared and rdglass will compute the Laplacian for both input files. Nmed is the smoothing parameter to reduce metrology noise. Rdglass calls routine to evaluate Laplacian.

rdglass,nam1,nam2,d1,d2,nsmth,lap1,lap2,nmed

2. Laplaceg evaluates the local surface curvature density assuming input array z(x,y) in dat. Uses input filtering radius, rad, to minimize metrology errors (in dat pixel units). Lap(x,y) on output is local curvature density where pix(area) x lap(x,y)=1/(2xR) with R=local radius of curvature in dat units. Lapk creates Laplacian using Fourier filtering of metrology errors.

laplaceg,dat,lap,rad
lapk,dat,dt,lap,ksmo,fixb

3. Holeptrn takes input zlap and discretization size nsub to generate output array, out, of discretized curvature map corresponding to optical surface.

Example IDL code for these routines is as follows:

```
holeptrn,zlap,nsub,out
; this makes hole pattern to match glass curvature
; zlap is (square) curvature (laplacian), nsub is number of pixels in sub
region (even multiple of array)
; out is output dot image
pro holeptrn,zlap,nsub,out
si=size(zlap)
nx = si(1)
ny = si(2)
out = fltarr(nx,ny)
sl0 = min(zlap)
sl1 = max(zlap)
ns = nx/nsub
subar = rebin(zlap,ns,ns)
sl0 = min(subar)
sl1 = max(subar)
dc = (sl1-sl0)/nsub
subar = (subar(*,*)-sl0)/dc
out(*,*)=0.
hole = fltarr(nsub,nsub)
x = findgen(nsub)-nsub/2.
y = x
one = fltarr(nsub)
one(*)=1.
hole = sqrt(x^2#one + one#y^2)
holet=hole
for ix = 0,ns-1 do begin
    for iy = 0,ns-1 do begin
        spot = where(hole lt subar(ix,iy)/2.)
        holet(*,*)=0
        holet(spot) = 1
        out(ix*nsub:(ix+1)*nsub-1,iy*nsub:(iy+1)*nsub-1) = holet
    endfor
endfor
;stop
end
; this to evaluate laplacian on noisy data
; for glass surface
; dat is input z(x,y)
; lap is laplacian
; rad is radius for median filter
pro laplaceg,dat,lap,rad
si =size(dat)
nx = si(1)
ny = si(2)
totl = fltarr(nx,ny)
lap = fltarr(nx,ny)
totl = totl + shift(dat,0,1)
totl = totl + shift(dat,0,-1)
totl = totl + shift(dat,1,0)
totl = totl + shift(dat,-1,0)
totl = totl - 4*dat
for ix = rad,nx-rad-1 do begin
    for iy = rad,ny-rad-1 do begin
        val = totl(ix,iy)
        if rad gt 0 then val = median(totl(ix-rad:ix+rad,iy-rad:iy+rad))
        lap(ix,iy) = val
    endfor
endfor
;stop
end
; compute laplacian in frequency space with some filtering
; dat is input square array
; dt is bad pixel fixed output
; lap is either k smoothed or laplacian approximation
; ksmo is maximum k radius to use
; fixb is radius of median filter for bad pixels
pro lapk,dat,dt,lap,ksmo,fixb
si = size(dat)
np = si(1)
dt = fltarr(np,np)
; median data value
```

-continued

```
mdat = median(dat)
; bad data are more than median away from mdat
nbad = 0
bad = where(dat lt 0 or dat gt 2*mdat,nbad)
dt = dat
; generate moving median to fill in bad points
if nbad gt 0 then begin
    for j = 0, nbad-1 do begin
        ix = bad(j) mod np
        iy = bad(j)/np
        ix0 = (ix-fixb>0)
        ix1 = (ix+fixb<np-1)
        iy0 = (iy-fixb>0)
        iy1 = (iy+fixb<np-1)
        dt(ix,iy)=median(dat(ix0:ix1,iy0:iy1))
    endfor
endif
; make k2 array for frequency space laplacian
kv = findgen(np) - np/2
kv = kv^2
one = fltarr(np)
one(*) = 1.
kvv = (one#kv) + (kv#one)
zero = where(kvv gt ksmo*ksmo,nsmo)
if nsmo gt 0 then kvv(zero)=0
good = where(kvv ne 0,ng)
; this for doing smoothing
if ng gt 0 then kvv(good) = 1
dtf = fft(dt,-1)
dtf = shift(dtf,np/2,np/2)
dtf = dtf*kvv
dtf = shift(dtf,-np/2,-np/2)
lap = float(fft(dtf,1))
;stop
end
; read glass shape and shape difference
; smooth with d2s = smooth(d2,10)
; get laplacian with laplaceg,d2s,lap,10
; nam1 and nam2 are zygo format 0V and xkV files
; d1 is glass shape, and d2 is shape difference
; nsmth is pixels to smooth (20) in shape difference data
; lap is output laplacian from nmed (20) median boxcar
pro rdglass,nam1,nam2,d1,d2,nsmth,lap1,lap2,nmed
;rdzygodat,'/INSA/4actuatordats/1actuated-NO1-_FP-
plasD5_100x1lay_dia16mm_V0kV.dat', br, d
;rdzygodat,'/INSA/4actuatordats/1actuated-NO1-_FP-
plasD5_100x1lay_dia16mm_V3kV.dat', br, d3
x0 = -10.
x1 = 10.
rdzygodat,nam1,br1,d1
rdzygodat,nam2,br2,d2
si = size(d1)
si2 = size(d2)
x=[si(1),si(2),si2(1),si2(2)]
npt = min(x)
np = (npt/2)*2
d1 = d1(0:np-1,0:np-1)
d2 = d2(0:np-1,0:np-1)
bad = where(d1 gt x1 or d1 lt x0,nb)
if nb gt 0 then d1(bad) = 0.
bad = where(d2 gt x1 or d2 lt x0,nb)
if nb gt 0 then d2(bad) = 0.
d2 = d2-d1
d1 = smooth(d1,nsmth)
laplaceg,d1,lap1,nmed
d2 = smooth(d2,nsmth)
laplaceg,d2,lap2,nmed
;dat = d(0:941,0:941)
;dat2 = d3(0:941,0:941)-dat
;rdzygodat,'/INSA/4actuatordats/3actuated-NO2-3-4_FP-
plasD5_100x1lay_dia16mm_V0kV.dat',br,d
;rdzygodat,'/INSA/4actuatordats/3actuated-NO2-3-4_FP-
plasD5_100x1lay_dia16mm_V3kV.dat',br,d3
;dt3 = d(0:941,0:941)
;dt32 = d3(0:941,0:941)-dat
end
; write x,y,z text format output file
pro wxyz,n1,d
si=size(d)
```

-continued

```
nx = si(1)
ny = si(2)
close,1
openw,1,n1
for ix = 0,nx−1 do begin
    for iy = 0,ny−1 do begin
        printf,1,format='(i,i,e15.2)',ix,iy,d(ix,iy)
    endfor
endfor
close,1
end
;
```

§ 4.6 CONCLUSIONS

Example embodiments consistent with the present description can provide one or more of the following advantages. First, glass as less than 5 mm thick, and as thin as 1 mm thick, can be shaped to optical tolerances without degrading the highly specular smooth reflective surface of "fire-polished float" glass. Further, optical components (such as mirrors) generated by the example techniques consistent with the present description can have light-scattering properties that are superior to (e.g., by an order of magnitude) optical components made using conventional abrasive polishing. Furthermore, example methods consistent with the present description are easily scalable to large mirrors, limited only by glass sheet fabrication and 3D printer gantry size. Surfaces can be optically shaped subject to gravitational and mirror support deformation. Moreover, the cost of producing square meter scaled optics using methods consistent with the present description can be as much as two order of magnitude less than the cost of conventional polishing of square-meter-scale mirror optics. Finally, apparatus and systems for performing the methods consistent with the present description can use relatively inexpensive and commercially available 3D printer hardware and/or commercially available $CO_2$ lasers.

What is claimed is:

1. A method for producing a thin glass sheet having a desired surface profile, the method comprising:
    a) receiving information about an actual surface of a thin glass sheet to be processed, wherein the actual surface of the thin glass sheet has root-mean-square (rms) surface shape errors on transverse surface scales of 1 cm to 10 cm of up to 5 microns;
    b) receiving information describing the desired surface profile of the thin glass sheet;
    c) determining a corrective curvature based on (1) the information describing the actual surface of the thin glass sheet, and (2) the information describing the desired surface profile of the thin glass sheet;
    d) determining at least one parameter of a laser melting glass shaping process wherein the at least one parameter is at least one of (A) laser power, (B) laser spot size, and/or (C) laser dwell time; and
    e) applying the laser melting glass shaping process to a working surface of the thin glass sheet opposite the actual surface using the determined at least one parameter to produce a thin glass product with
        (1) (A) beads formed on the working surface, and/or (B) beads partially embedded in the working surface, and
        (2) a corrected actual surface having residual rms surface shape errors no larger than 50 nm over 1-10 cm length scales.

2. The method of claim 1 wherein the corrective curvature is determined using a Laplacian of surface data of the thin glass sheet and the desired surface profile of the thin glass sheet.

3. The method of claim 1 wherein the information about the actual surface of the thin glass sheet to be processed is received by measuring with an interferometer, the surface of the thin glass sheet to be processed.

4. The method of claim 1 wherein the thin glass product has a front surface area of at least one $meter^2$.

5. The method of claim 1 wherein the thin glass product has a thickness of less than 5 mm.

6. The method of claim 1 wherein the thin glass product has a thickness from 2 mm to 4 mm.

7. The method of claim 1 wherein the thin glass sheet has a working surface and a mirror surface, and
    wherein the laser wavelength is selected such that the laser power does not penetrate to the mirror surface of the thin glass sheet.

8. The method of claim 1 wherein the thin glass sheet has a working surface and a mirror surface, and
    wherein the laser melting glass shaping process causes a negative curvature on the mirror surface to be generated by an increase in the surface tension on the working surface.

9. The method of claim 1, wherein the thin glass product produced has beads formed on the working surface.

10. The method of claim 1, wherein the thin glass product produced has beads partially embedded in the working surface.

11. The method of claim 1, wherein the beads increase a surface tension on the working surface.

12. A method for producing a thin glass sheet having a desired surface profile, the method comprising:
    a) receiving information about an actual surface of a thin glass sheet to be processed, wherein the actual surface of the thin glass sheet can have root-mean-square (rms) surface shape errors on the order of microns on transverse surface scales of 1 cm;
    b) receiving information describing the desired surface profile of the thin glass sheet;
    c) determining a corrective curvature based on (1) the information describing the actual surface of the thin glass sheet, and (2) the information describing the desired surface profile of the thin glass sheet;
    d) determining at least one parameter of a laser melting glass shaping process wherein the at least one parameter is at least one of (A) laser power, (B) laser spot size, and/or (C) laser dwell time; and
    e) applying the laser melting glass shaping process to a working surface of the thin glass sheet opposite the actual surface using the determined at least one parameter to produce a thin glass product with
        (1) (A) beads formed on the working surface, and/or (B) beads partially embedded in the working surface, and
        (2) a corrected actual surface having residual rms surface shape errors no larger than 50 nm over 1-10 cm length scales.

13. The method of claim 12, wherein the thin glass product produced has beads formed on the working surface.

14. The method of claim 12, wherein the thin glass product produced has beads partially embedded in the working surface.

15. The method of claim 12, wherein the beads increase a surface tension on the working surface.

\* \* \* \* \*